(12) United States Patent
Wombacher et al.

(10) Patent No.: US 9,145,335 B2
(45) Date of Patent: Sep. 29, 2015

(54) PROCESS FOR PRODUCING HARDENING ACCELERATORS FOR MINERAL BINDER COMPOSITIONS

(71) Applicant: SIKA TECHNOLOGY AG, Baar (CH)

(72) Inventors: Franz Wombacher, Jonen (CH); Beat Marazzani, Oberengstringen (CH); Christian Bürge, Schafisheim (CH); Christophe Kurz, Endingen (CH); Gilbert Mäder, Marthalen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/360,052

(22) PCT Filed: Dec. 5, 2012

(86) PCT No.: PCT/EP2012/074501
§ 371 (c)(1),
(2) Date: May 22, 2014

(87) PCT Pub. No.: WO2013/083627
PCT Pub. Date: Jun. 13, 2013

(65) Prior Publication Data
US 2014/0305345 A1    Oct. 16, 2014

(30) Foreign Application Priority Data
Dec. 5, 2011    (EP) .................................... 11191944

(51) Int. Cl.
C04B 28/02    (2006.01)
C04B 40/00    (2006.01)
C04B 22/08    (2006.01)
C04B 28/04    (2006.01)
C04B 103/12   (2006.01)
C04B 103/14   (2006.01)

(52) U.S. Cl.
CPC ............... *C04B 22/085* (2013.01); *C04B 28/02* (2013.01); *C04B 28/04* (2013.01); *C04B 40/0039* (2013.01); *C04B 40/0042* (2013.01); *C04B 2103/12* (2013.01); *C04B 2103/14* (2013.01)

(58) Field of Classification Search
CPC ........ C04B 28/02; C04B 28/04; C04B 12/04; C04B 22/082; C04B 22/085; C04B 22/0086; C04B 40/00; C04B 40/0039; C04B 40/0042; C04B 2103/12; C04B 2103/14; C04B 2103/20
USPC ......... 106/630, 691, 724, 781, 795, 806, 823, 106/728, 802, 810, 819
See application file for complete search history.

(56) References Cited

U.S. PATENT DOCUMENTS

2011/0203486 A1* 8/2011 Nicoleau et al. ............... 106/696

FOREIGN PATENT DOCUMENTS

| DE | 10 2004 016 127 B3 | 8/2005 |
| EP | 1 348 729 A1 | 10/2003 |
| EP | 1 138 697 B1 | 11/2003 |
| EP | 1 061 089 B1 | 3/2004 |
| EP | 1 580 176 A2 | 9/2005 |
| JP | A-2008-137817 | 6/2008 |
| WO | WO 2010/026155 A1 | 3/2010 |

OTHER PUBLICATIONS

Jun. 10, 2014 International Preliminary Report on Patentability issued in International Application No. PCT/EP2012/074501.

* cited by examiner

Primary Examiner — Anthony J Green
(74) Attorney, Agent, or Firm — Oliff PLC

(57) ABSTRACT

A process for preparing a setting and hardening accelerator for mineral binders includes the following steps: a) reacting a calcium compound CV with a silicon compound SV, and b) adding an acidic compound having a molecular weight of not more than 200 g/mol, more particularly 40-100 g/mol.

19 Claims, No Drawings

PROCESS FOR PRODUCING HARDENING ACCELERATORS FOR MINERAL BINDER COMPOSITIONS

TECHNICAL FIELD

The invention relates to a process for producing a setting and hardening accelerator for mineral binders, comprising a step of reacting a calcium compound CV with a silicon compound SV. Further, the invention relates to a setting and hardening accelerator and a binder composition, containing such an accelerator. The invention also relates to the use of a setting and hardening accelerator to improve early compressive strength of mineral binders.

PRIOR ART

Prefabricated concrete or steel-reinforced concrete components or roadway or track renovations increasingly require early strength, so that the concrete components can already be deshuttered, transported, stacked, or biased, or the roadways or tracks can be driven on after a few hours. In order to achieve this goal in practice, frequently heat or steam treatments are used aside from high-performance concrete formulations such as low w/c value or high cement content. These treatments require a lot of energy, therefore, because of rising energy prices, significant investment costs, and problems in connection with permanence and visually exposed concrete, these treatments are increasingly being abstained from, and other ways for accelerating the hardening process are being sought.

It is possible, in particular, to use setting and hardening accelerating additives. In this context, WO 2010/026155 A1 (Construction Research & Technology GmbH) describes, for example, an accelerator composition which is produced by a precipitation reaction of a calcium compound and a silicon compound in the presence of a water-soluble comb polymer acting as a liquefier.

Thus far, in general, accelerating additives have not been a satisfactory alternative to heat or steam treatments. Although additives based on calcium compounds and silicon compounds have an accelerating effect on setting and hardening they frequently have the disadvantage that they are so highly viscous in their consistency that their production and use, particularly metering, is costly.

Although the viscosity can be reduced by the addition of plasticizers, however, the additional plasticizer in mortar or concrete compositions results in a w/c-dependent change of the flow diameter, which is generally not desirable. Furthermore, use of known accelerating additives leads to greatly reduced workability of the mortar and concrete compositions, as the result of a significant reduction in the flow diameter of the concrete.

Therefore, there is still a need to provide accelerating additives as well as processes for the production thereof, which do not exhibit the disadvantages mentioned above.

PRESENTATION OF THE INVENTION

Object of the present invention is therefore to provide improved accelerating additives and processes for the production thereof. In particular, the accelerating additives should have a very low viscosity, at the same time be simple to produce, and moreover have high storage stability, and possibly not adversely affect the workability of concrete and mortar. In particular, the processes for producing the accelerating additives should be kept as simple as possible and be as economical as possible.

Surprisingly, it has been found that this can be achieved by the process according to claim 1. The key of the invention is the addition of an acidic compound having a molecular weight of not more than 200 g/mol, more particularly from 40-100 g/mol.

Surprisingly, by the addition of said acidic compound setting and hardening accelerators produced in this way have a lower viscosity together with high storage stability compared with conventional accelerators. In addition, the accelerators according to the invention show favorable flow diameter and good early compressive strength of mortar or concrete produced therewith. The production process according to the invention can be kept relatively simple and allows the use of inexpensive raw materials that are available worldwide in sufficient quantities, which benefits cost effectiveness.

Further aspects of the invention are the subject of further independent claims.

Particularly preferred embodiments of the invention are subject of the dependent claims.

WAYS OF IMPLEMENTING THE INVENTION

In a first aspect, the present invention comprises a process for the production of a setting and hardening accelerator for mineral binders, comprising the steps of:
a) reacting a calcium compound CV with a silicon compound SV, and
b) adding an acidic compound having a molecular weight of not more than 200 g/mol, more particularly 40-100 g/mol.

Said calcium compound and silicon compound are designated CV and SV, respectively, merely to improve readability. This designation is in no way to be construed as limiting. Steps a) and b) can be carried out generally in any sequence.

The term "mineral binder" refers in particular to a binder, which in the presence of water reacts in a hydration reaction under formation of solid hydrates or hydrate phases. It may be, for example, a hydraulic binder (e.g., cement or hydraulic lime), a latently hydraulic binder (e.g., slag), a pozzolanic binder (e.g., fly ash), or a non-hydraulic binder (e.g., plaster or calcium lime).

Here, the term "cementitious binder" or "cementitious binder composition", in particular, refers to a binder or a binder composition containing a proportion of at least 5% by weight, in particular at least 20% by weight, preferably at least 50% by weight and especially at least 75% by weight cement.

In particular, said mineral binder or said binder composition comprises a hydraulic binder, preferably cement. Particularly preferred is Portland cement, especially of the type CEM I (according to standard EN 197-1). The proportion of said hydraulic binder in the total mineral binder is advantageously at least 5% by weight, in particular at least 20% by weight, preferably at least 50% by weight and especially at least 75% by weight. According to a further advantageous embodiment, the mineral binder is made up of 100% hydraulic binder, in particular cement.

However, it can also be advantageous if the binder composition contains other binder in addition to or instead of a hydraulic binder. These are, in particular, latently hydraulic binders and/or pozzolanic binders. Suitable latently hydraulic and/or pozzolanic binders are slag, fly ash and/or silica dust, for example. Also, the binder composition can contain inert substances such as lime flour, quartz flour and/or pigments. In an advantageous embodiment, the mineral binder contains 5-95% by weight, in particular 20-50% by weight latently hydraulic and/or pozzolanic binders.

In the present context, in particular, "early compressive strength" is meant to be a compressive strength after 24 hours. Compressive strengths are defined, in particular, according to standard EN 12390-3.

An "acidic compound" is in particular a compound which, if added to pure water, is able to lower the pH. In particular, the acidic compound is a proton donor. A $pK_a$ value of the acidic compound is in particular ≤8. The $pK_a$ value represents the negative common logarithm of the acidity constant $K_S$.

In particular, the acidic compound does not include a polymeric compound. The acidic compound includes, in particular, no phosphoric acid esters. In the present context such compounds have been proven disadvantageous.

Preferably, step a) involves the reaction of said calcium compound CV with said silicon compound SV in the presence of a solvent. Suitable solvents are, for example, water, alcohols and/or polyalcohols, in particular, glycol, glycerol, ethanol, or isopropanol. Here, water is the most preferred solvent.

In particular, therefore, step a) involves the reaction of said calcium compound CV with said silicon compound SV in the presence of water, especially in aqueous solution. In particular, the reaction in step a) comprises a precipitation reaction between said calcium compound CV and said silicon compound SV. In particular, said calcium compound CV is reacted with said silicon compound SV to form a calcium silicate hydrate suspension.

In particular, prior to the reaction in step a), said calcium compound CV is provided in form of a solution CVL containing said calcium compound CV, in particular an aqueous solution CVL containing said calcium compound CV. Said solution CVL containing said calcium compound CV in this case contains said calcium compound CV, a solvent, and optionally other substances. Hereinafter, said solution CVL containing said calcium compound CV is also referred to as "calcium solution CVL". In particular, water is used as a solvent. A concentration of said calcium compound CV in said calcium solution CVL is advantageously in the range of 5 to 80% by weight, in particular 30-70% by weight, more preferably 40-60% by weight.

Also, advantageously, said silicon compound SV is provided in form of a solution SVL containing said silicon compound SV, in particular an aqueous solution SVL containing said silicon compound SV. Said solution SVL containing said silicon compound SV in this case contains said silicon compound SV, a solvent, and optionally other substances. In particular, water is used as a solvent. Hereinafter, said solution SVL containing said silicon compound SV is also referred to as "silicon solution SVL". A concentration of said silicon compound SV in said silicon solution SVL is advantageously in the range of 5 to 60% by weight, in particular 10-50% by weight, more preferably 10-40% by weight.

Here, in particular, said calcium solution CVL and said silicon solution SVL are provided separately.

Providing said calcium compound CV and said silicon compound SV in form of solutions in particular enables a simpler process management and control.

Said calcium solution CVL and silicon solution SVL are designated CVL and SVL, respectively, merely to improve readability. This designation is in no way to be construed as limiting.

In particular, during the process said calcium solution CVL is metered in said silicon solution SVL and/or said silicon solution SVL is metered in said calcium solution CVL. The metered addition is carried out in particular continuously and/or stepwise. Similarly, said calcium solution CVL can be mixed with said silicon solution SVL.

The reaction in step a) preferably takes place in a liquid phase reactor. In this context, the liquid phase reactor is selected from the group consisting of Sulzer mixer reactor, reactor with external recirculation, cascade reactor, loop reactor, reactor stator mixer, and stirred reactor. Preferred liquid-phase reactors are, in particular, stirred reactors and static mixers.

Typically, step a) is carried out at a temperature of −10-90° C., a pH of 6-12 and a pressure of 0.8-20 bar. It can sometimes also be useful to carry out step a) under an inert atmosphere, e.g., an $N_2$ atmosphere in order to reduce undesired side reactions with reactive air components.

The addition of said acidic compound can take place before and/or during and/or after step a).

In a preferred embodiment, said acidic compound is added before and/or during step a). As has been shown, in doing so, in particular, the viscosity of the setting and hardening accelerator produced can be reduced. The addition of said acidic compound before step a) also contributes to a favorable workability and setting time of binder compositions containing accelerators so produced.

More preferably, said acidic compound is added prior to step a). In this case, it is advantageous to admix said acidic compound with said calcium compound CV and/or said silicon compound SV. In particular, said acidic compound is admixed with a calcium solution CVL and/or a silicon solution SVL. Particularly advantageous is said admixing of said acidic compound with said calcium solution CVL. In this context, in particular at least 50% by weight of said acidic compound, especially the entire amount of said acidic compound, is admixed with said calcium solution CVL. In this case, said acidic compound is provided in particular as part of said calcium solution CVL together with said calcium compound CV. As has been shown, said acidic compound in general can be relatively well dissolved in said calcium solution CVL without solids precipitating or phase separations occurring. Typically, this is only sometimes the case with said silicon solution SLV.

It may also be advantageous, however, to add said acid compound after step a). This can possibly simplify the production process. It also possible to add a first portion of said acidic compound before step a) and another portion of said acidic compound during and/or after step a). Furthermore, said acidic compound can, e.g. dissolved in water or neat, may be metered in separately even during mixing of said calcium solution CVL and said silicon solution SVL.

Preferably, in the course of the reaction of step a) the mole ratios are as follows: calcium:silicon=0.5-2.0, preferably 0.8-1.5, more particularly 0.9-1.2. In particular, when using accelerators in hydraulic binders this results in an advantageous flow diameter with simultaneous high early compressive strength.

Typically, said calcium compound CV is selected from the group consisting of calcium chloride, calcium nitrate, calcium formate, calcium acetate, calcium bicarbonate, calcium bromide, calcium citrate, calcium chlorate, calcium hydroxide, calcium oxide, calcium hypochloride, calcium iodates, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium bismaleinate, calcium fumarate, calcium adipate, and calcium aluminate. Preferably, said calcium compound CV is a highly water-soluble calcium compound; most preferred are calcium nitrate, calcium acetate, and calcium sulfamate.

Advantageously, said silicone compound SV is selected from the group consisting of sodium silicate, potassium silicate, lithium silicate, water glass, silicic acid, sodium metasilicate, potassium metasilicate, disodium metasilicate, dipotassium metasilicates, silica, disodium disilicate and disodium trisilicate. Preferably, said silicone compound SV is a water-soluble silicone compound; most preferred are water glasses, particularly sodium silicate and potassium silicate.

In the present document, the term "water glass" means water-soluble salts of silicic acids, particularly potassium and sodium silicates which have solidified from the melt flow, or their aqueous solutions, as they are described in CD Römpp Chemie Lexikon, version 1.0, Georg Thieme Verlag, Stuttgart, 1995.

Sodium silicate is particularly preferred as said silicon compound SV. If said silicone compound SV is sodium silicate, a molar ratio of $SiO_2:Na_2O=0.5-4.0$, preferably 0.8-2, more particularly 1.0-1.5 is preferred.

Potassium silicate, for example, is also suitable as said silicon compound. If said silicone compound SV is potassium silicate, a molar ratio of $SiO_2:K_2O=0.5-4.0$, preferably 0.8-2, more particularly 1.0-1.5 is preferred.

In a preferred embodiment, said calcium compound CV is calcium nitrate and said silicone compound SV is sodium silicate. Preferably, during the reaction in step a) the molar ratio is calcium nitrate:sodium silicate=0.25-8.0, preferably 0.65-3, more particularly 0.75-1.75, wherein said sodium silicate preferably has a molar ratio $SiO_2:Na_2O$ of 0.8-1.5. This is particularly advantageous for achieving an advantageous flow diameter in hydraulic binders with simultaneous high early compressive strength.

Advantageously, a proportion of said acidic compound per se is 0.01-12% by weight, preferably 1-8% by weight, more preferably 2-7% by weight, based on the total weight of said setting and hardening accelerator.

If said acidic compound is added before and/or during step a), the proportion of said acidic compound is in particular 1-12% by weight, preferably 2-8% by weight, more preferably 3-6% by weight, based on the total weight of the setting and hardening accelerator.

If said acidic compound is added after step a), the proportion of said acidic compound is in particular 0.1-8% by weight, preferably 0.3-5% by weight, based on the total weight of the setting and hardening accelerator.

The proportions of said acidic compound are especially ideal if said setting and hardening accelerator is an aqueous suspension having a solids content of 5-50% by weight, in particular 10-30% by weight, especially 15-25% by weight. In case of other solids contents, the proportions of said acidic compound can be adjusted accordingly.

Advantageously, said acidic compound has a $pK_a$ value of −2-8, in particular from 1-7, preferably 1-5. For acidic compounds with several acid groups and/or acidic protons, the lowest $pK_a$ value is the most relevant one. In other words, in the case of acidic compounds with several acid groups and/or acidic protons, the most acidic acid group and/or the most acidic proton are/is the most relevant one. Acidic compounds with such $pK_a$ values can easily be dosed at optimal effectiveness.

More preferably, the acidic compound comprises or is nitric acid, sulfamic acid, methanesulfonic acid, formic acid, acetic acid, fumaric acid, oxalic acid, maleic acid, maleic acid, glycolic acid and/or lactic acid. Particularly preferred are nitric acid, sulfamic acid, formic acid and/or acetic acid. In particular, the last-mentioned acids form readily soluble calcium salts, which is advantageous in the present context. In addition, such acids have little retarding effect in terms of the setting and hardening process of mortar and concrete compositions. Moreover, these acids have a relatively low molecular weight per acid group, so that relatively small amounts are sufficient to achieve an optimal effect.

According to an advantageous embodiment, the acidic compound is an organic acid, in particular a monocarboxylic acid. Formic acid and/or acetic acid are/is preferred. Acetic acid is particularly preferred. In particular, such acids are non-corrosive and are very advantageous in terms of the effects according to the invention.

If said calcium compound CV or calcium solution CVL is produced with the aid of an acidic compound, in particular, more acidic compound is added in step b) than is necessary for the salt formation of the calcium salt. This is the case particularly in the case of calcium oxide, calcium hydroxide, calcium carbonate and calcium hydrogen carbonate. Advantageously, said acid compound is used in excess of ≥5% by mole, in particular ≥10% by mole, especially ≥20% by mole, based on the amount of acidic compound which is required for the production of said calcium compound.

Particularly, said calcium compound CV or said calcium solution CVL has a pH<7, preferably ≤6, more preferably ≤5, in particular ≤4, especially ≤3

Particularly, said silicon compound SV or said silicon solution SVL has a pH>7, preferably ≥9, more preferably ≥10, in particular ≥11, especially ≥12.

Advantageously, the reaction of said calcium compound CV with said silicon compound SV, or step a) of the process is carried out at a pH of 6-12, in particular 7-12, preferably 7-11, more preferably 9-10.5.

Preferably, the reaction of said calcium compound CV with said SV silicon compound or step a) of the process takes place in the absence of a hydraulic binder and/or in the absence of a cementitious binder and/or in the absence of cement. This means in particular that a proportion of such substances during the reaction is <10% by weight, preferably <5% by weight, especially <1% by weight, particularly preferably <0.5% by weight or <0.1% by weight. Especially, there are no such substances present during the reaction.

Where applicable, mixing with such substances is carried out, in particular, only when using the setting and hardening accelerator produced, and which takes place in particular with a time delay and/or spatially separated from the production of the setting and hardening accelerator.

Following the production of said setting and hardening accelerator, advantageously, a pH value is in the range of 7-12, in particular 7-11, preferably 9-10.5. Such accelerators have been shown to be optimal in terms of viscosity, flow diameter and early compressive strengths.

Following the production of said setting and hardening accelerator, advantageously, viscosity is in the range of 10 2000 mPas, in particular 50-1000 mPas. Such accelerators can be produced and used particularly efficiently, and have high storage stability.

Viscosity is determined, in particular, at a temperature of 23° C. Preferably, viscosity is determined with a rotational viscometer, more particularly, a rotational viscometer Model RVT from Brookfield, at 100 rpm.

Said setting and hardening accelerators produced by the process according to the invention are particularly storage stable, preferably for several days, more preferably for several weeks, especially for several months. This means that consistency and/or viscosity of the setting and hardening accelerators produced is substantially constant during these times. This means, in particular, that viscosity changes less than 50%, preferably less than 25%, particularly less than 10% or less than 5%.

It may be particularly advantageous for the early compressive strength resulting from the accelerator, if the process further comprises a step c) of comminuting the reaction product of step a). In particular, step c) involves comminuting by agitated bead mills, roll mills, colloid mills, rotor-stator mixers and/or homogenizers, preferably by homogenizers. Preferably, step c) is carried out after step a) and after step b).

Preferably, step c) results in an average particle size of the reaction product of ≤2000 nm. This is particularly advantageous for the early strength resulting from the accelerator.

According to a further advantageous embodiment, the process comprises adding at least one further hardening-accelerating substance.

Generally, for this purpose a variety of substances known to the person skilled in the art may be used. Particularly advantageously, however, said further hardening-accelerating substance comprises one or more of the following representatives:

a) one or more amino alcohols
b) one or more alkali and/or alkaline earth metal nitrates
c) one or more alkali and/or alkaline earth metal nitrites
d) one or more alkali metal and/or alkaline earth metal thiocyanates, in particular sodium thiocyanate
e) one or more α-hydroxycarboxylic acids, in particular lactic acid
f) one or more alkali and/or alkaline earth metal halides, in particular sodium chloride and/or calcium chloride
g) glycerol and/or glycerol derivatives
h) one or more glycols and/or glycol derivatives
i) one or more aluminum salts
j) one or more alkali and/or alkaline earth metal hydroxides.

As has been shown, said other accelerator components are generally very compatible with these representatives.

Especially advantageously, said at least one further hardening-accelerating substance comprises at least one amino alcohol. Diethanolamine, N-methyldiethanolamine, N-methyldiisopropanolamine, N,N,N',N'-tetrakis(hydroxypropyl)-ethylenediamine, tris(hydroxymethyl)-aminomethane are preferred. Diethanolamine and/or N-methyldiethanolamine are especially preferred. N-methyldiethanolamine is particularly preferred.

Advantageously, a proportion of said at least one further hardening-accelerating substance, in particular of an amino alcohol, is from 1 to 15% by weight, preferably 3-12% by weight, more preferably 6-11% by weight, based on the total weight of said setting and hardening accelerator.

The proportions of said at least one further hardening-accelerating substance are particularly optimal if the setting and hardening accelerator is an aqueous suspension having a solids content of 5-50% by weight, in particular 5-30% by weight, especially 15-25% by weight.

Advantageously, said at least one further hardening-accelerating substance is admixed with said calcium solution CVL before step a). In general, there is good miscibility of said further hardening-accelerating substance with the components of said calcium solution CVL.

Basically, said further hardening-accelerating substance can, however, also be added to said silicon solution SVL, or it is added only after step a), in particular after step a) and after step b).

It may be further advantageous if the process further comprises a step of adding a thickening agent, in particular selected from the group consisting of cellulose ethers, polysaccharides, starch derivatives, polyvinyl alcohols, polyacrylates, latex, guar gum, alginates and polyacrylrylamides. Such thickening agents have been shown to be compatible with the other components of the accelerator and allow the targeted adjustment of the viscosity of the accelerator. Generally, the addition of said thickening agent can take place at any time during the process.

It may also be advantageous if the process further comprises a step of adding an additive, in particular a concrete additive and/or a mortar additive. Said at least one additive comprises in particular a pH regulator, a defoamer, a dye, a preservative, a plasticizer, a dispersant, a retarder, an air entraining agent, a shrinkage reducing agent and/or a corrosion inhibitor and/or mixtures thereof. Generally, the addition of said additive can take place at any time during the process. However, an addition is advantageous mostly after step a), in particular after step a) and after step b) or c).

Advantageously, said at least one additive includes a plasticizer. Said plasticizer includes in particular a polycarboxylate, in particular a polycarboxylate ether. In particular, said plasticizer is a comb polymer, comprising a polycarboxylate backbone with polyether side chains attached thereto. The side chains are attached to said polycarboxylate backbone, in particular, via ester, ether and/or amide groups.

Corresponding polycarboxylate ethers and manufacturing processes are disclosed, for example, in EP 1 138 697 B1 on page 7, line 20 to page 8, line 50, and in examples therein, or in EP 1 061 089 B1 on page 4, line 54 to page 5, line 38 and in examples therein. In a variant thereof, as described in EP 1 348 729 A1 on page 3 to page 5 and in examples therein, said comb polymer can be produced in the solid state. The disclosure of these cited patents is hereby particularly incorporated by reference.

Such comb polymers are sold commercially by Sika AG Switzerland under the trade name series ViscoCrete®.

However, for example, plasticizer in form of lignin sulfonates, sulfonated naphthalene-formaldehyde condensates, sulfonated vinyl copolymers, allyl ether-maleic acid copolymers and/or sulfonated melamine-formaldehyde condensates can be used as well.

Advantageously, the plasticizer is added after step a), in particular after step a) and after step b) or c).

Particularly preferred is a process for producing a setting and hardening accelerator for mineral binders in which:
as said calcium compound CV, calcium nitrate is used and the same is provided before the reaction in step a) in form of an aqueous solution CVL containing said calcium compound CV, and
as the silicon compound SV, sodium silicate is used, said sodium silicate having a molar ratio $SiO_2:Na_2O$ of 1.0-1.5, and the same is provided in form of an aqueous solution SVL containing said silicon compound SV, and
the molar ratio during the reaction in step a) of calcium nitrate:sodium silicate=0.25-8.0, preferably 0.65-3, more preferably 0.75-1.75, and
step b) takes place before step a), and
said acidic compound is an organic acid having a $pK_a$ of 1-7, preferably 1-5, and is a monocarboxylic acid, with acetic acid being most preferred, and
said acidic compound has a proportion of 1-8% by weight, more preferably 2-7% by weight, based on the total weight of the setting and hardening accelerator, and
optionally an additional hardening-accelerating substance is added, in particular an amino alcohol with N-methyl diethanolamine being preferred.

In a further aspect, the present invention relates to a setting and hardening accelerator produced by one of the abovementioned processes. Preferably, the setting and hardening accelerator is present as a solid or liquid, in particular a powder or suspension. Preferably, a suspension has a solids content of 5-50% by weight, in particular 10-30% by weight, especially 15-25% by weight. A powder is preferably free-flowing and/or substantially free of water.

Preferably, the setting and hardening accelerator per se is substantially free of hydraulic and/or cementitious binders and/or cement. This means in particular that a proportion of such substances is <10% by weight, preferably <5% by weight, especially <1% by weight, particularly preferably <0.5% by weight or <0.1% by weight.

The setting and hardening accelerator according to the invention is used in various fields, particularly in cement and concrete technology. The accelerator has particularly good properties as an accelerator for mineral binders, such as those described above. In addition, said accelerator is easy to process, inter alia, because of its relatively low viscosity. Thus, the accelerator can be used for accelerating the setting and hardening of mineral binders, especially hydraulic binders, and in particular of quick-setting cement, as well as mortar or concrete produced therefrom. Furthermore, the accelerator according to the invention can be used to produce mortar or concrete having high early and final strength. Said setting and hardening accelerator according to the invention is therefore particularly suitable when very soon after the application said hydraulically setting composition must be pressure-resistant or walkable, for example in road or bridge construction, in the prefabrication of concrete elements in concrete and reinforced concrete components or runway renovations, especially airstrips, so that the finished parts can be deshuttered, transported, stacked, or biased already, or the roadways or tracks can be driven on after a few hours.

Said accelerator according to the invention can be used for the use according to the invention, both in liquid and in solid form, either alone or as part of an additive composition. The invention therefore additionally relates to an additive composition in liquid or solid form, comprising at least one accelerator according to the invention. Furthermore, for example, said additive composition can include additionally further hardening-accelerating substances, plasticizers or additives, in particular concrete additives and/or mortar additives. These are in particular the representatives mentioned above in conjunction with the process according to the invention.

Said accelerator according to the invention or said additive composition is used preferably in an amount of 0.01 to 15% by weight, in particular 0.01-10% by weight, preferably 0.2-8% by weight, based on the weight of said mineral binder to achieve the desired effect. Also, several accelerators may be mixed to suit the desired effect, for example, to particular circumstances.

Said accelerator according to the invention or said additive composition, for example, may be present in the solid or pasty state and optionally mixed with a plasticizer, which is also present in the solid state, and can be stored or transported as such for a long period of time.

Said accelerator according to the invention or said additive composition containing said accelerator in the solid state can also be part of a cement composition, a so-called dry mix that can be stored for a long time and is typically used packaged in bags or stored in silos.

Said accelerator according to the invention or said additive composition containing said accelerator can also be added to a usual concrete composition together with or shortly before or shortly after the addition of water. The addition of the accelerator according to the invention in form of an aqueous dispersion, for example, as part of the mixing water and/or as part of a liquid additive which is added to the mineral binder together with the mixing water, has proven particularly suitable in this case.

Said accelerator according to the invention or said additive composition can be added, for example, admixed with and/or sprayed on said binder and/or said additives before or after grinding of said mineral binder and/or hydraulic additives. For example, said mineral binder may also be coated at least partially with said accelerator or said additive containing said accelerator. This allows the production of a mineral binder, in particular cement or latently hydraulic slag, which already contains said accelerator or said additive containing said accelerator, and then can be stored and sold as ready-mix, for example, as so-called rapid cement. This cement has, after the addition of the mixing water, the desired characteristics of rapid setting and high early strength without having to add a further additive to the mixing water at the construction site.

Another aspect of the present invention relates to a binder composition containing a mineral binder and a setting and hardening accelerator as described above.

Advantageously, a plasticizer as described above, in particular a polycarboxylate ether, is present also. If present, said plasticizer is present in a proportion of 0.01-6% by weight, in particular 0.1-4% by weight, more preferably 0.2-3% by weight, based on the mineral binder. Due to the combination of the hardening accelerator according to the invention and the plasticizer, the workability of the binder composition can be improved and at the same time higher compressive strength are achieved. As has been shown, the plasticizer hardly or not at all affects the effect of the hardening accelerator.

In a further preferred embodiment, said binder composition further contains solid aggregates, especially gravel, sand and/or aggregates. Corresponding binder compositions may be used as mortar mixtures or concrete mixtures, for example.

In particular, said binder composition additionally contains water, wherein a weight ratio of water to mineral binder preferably is in the range of 0.25-1.0, in particular 0.3-0.6, preferably 0.35-0.5. Such binder compositions can be processed directly as mortar mixtures or concrete mixtures.

An additional aspect of the present invention relates to a molded body, which is obtainable by hardening of a binder composition described above after addition of water. The molded body thus produced can have almost any shape and can be, for example, part of a structure, such as a building, a masonry or a bridge.

In a further aspect, the present invention relates to a process for producing a binder composition wherein said at least one accelerator according to the invention is added, separately or premixed as additive composition, in solid or liquid form, to a mineral binder.

In a further aspect, the present invention relates to a process for accelerating the setting and hardening of mineral binders as well as mortar or concrete produced therefrom. Here, a setting and hardening accelerator according to the invention is added to a binder composition containing a mineral binder, in an amount of 0.01 to 15% by weight, in particular 0.01-10% by weight, preferably 0.2 to 8% by weight, based on the weight of the mineral binder.

Said hardening accelerator according to the invention or the additive composition can be used for accelerating the hardening of mineral binder compositions, in particular cementitious binder compositions.

Similarly, said accelerator according to the invention or said additive composition is suitable for increasing the early compressive strength, particularly the compressive strength after 24 hours, of mineral binder compositions, preferably cementitious binder compositions.

Said mineral binder compositions are defined as described above.

Further advantageous embodiments of the invention will become apparent from the following exemplary embodiments.

Exemplary Embodiments

1. Raw Materials Used

The following raw materials were used in the exemplary embodiments (Table 1):

TABLE 1

Raw materials used and names

| | | |
|---|---|---|
| CV | $Ca(NO_3)_2$ | Yara GmbH&Co, Germany |
| SV | Sodium silicate $Na_2O(SiO_2)_{1.2}$ | SL09910N, Van Baerle, Switzerland |
| PCE | Comb polymer, polymethacrylic acid with polyoxyalkylene side chains | Sika ViscoCrete-3081 S, Sika Schweiz, Switzerland (ca. 27% by weight solids content) |
| MDEA | N-Methyldiethanolamin | Independent Petroleum Distribution SA, Switzerland |
| MFA | Sulfonated melamine formaldehyde condensate | Sikament ®-FF 86, Sika Österreich GmbH, Austria |
| ACE | Polycarboxylate ether | Glenium ACE 30, BASF, Germany (ca. 30% by weight solids content) |
| | Formic acid (98%) | Impag AG, Switzerland |
| | Acetic acid (pure; >99%) | BHM Chemikalienhandel GmbH, Germany |
| | Oxalic acid (>97%) | Sigma-Aldrich, Switzerland |
| | Sulfamic acid (99%) | Brenntag Schweizerhall, Switzerland |
| | Nitric acid (65% weight in $H_2O$) | VWR, Switzerland |

2. Production of Setting and Hardening Accelerators

Accelerators according to the invention and comparative compounds were produced according to production processes 1 and 2 described below using the raw materials used in accordance with Chapter 1.

2.1 Production Process 1

Production process 1 is based on admixing said acidic compound before the reaction of said calcium compound CV with said silicon compound SV.

In a first step, a silicon solution SVL.1 was produced by dissolving 20% by weight of said silicon compound SV from Table 1 in pure water. The resulting solution was stirred for 1 minute. The molar ratio of $SiO_2:Na_2O$ is here 1.2.

In parallel, separately different calcium solutions CVL.1-CVL.12 and CVL.R1-CVL.R5 (for comparison purposes) were produced. Here, in each case, a 50% by weight solution of calcium compound CV [$Ca(NO_3)_2$] listed in Table 1 was provided first, an acidic compound and MDEA admixed, in addition pure water was added for dilution and the solution stirred for 1 minute. Said acidic compounds used in each case, and the quantities of the individual components are given in Table 2.

TABLE 2

Composition of the calcium solutions CVL produced.
All percentages are % by weight.

| No. | CV | Acidic compound | MDEA | Water |
|---|---|---|---|---|
| CVL.1 | 40% | Oxalic acid/7.0% | 13.6% | 39.4% |
| CVL.2 | 40% | Nitric acid/15.1% | 13.6% | 31.3% |
| CVL.3 | 40% | Nitric acid/10.6% | 13.6% | 35.8% |
| CVL.4 | 40% | Sulfaminic acid/15.2% | 13.6% | 31.3% |
| CVL.5 | 40% | Formic acid/4.8% | 13.6% | 41.6% |
| CVL.6 | 40% | Formic acid/3.6% | 13.6% | 42.9% |
| CVL.7 | 40% | Acetic acid/12.5% | 13.6% | 33.9% |
| CVL.8 | 40% | Acetic acid 79.3% | 13.6% | 37.1% |
| CVL.9 | 40% | Acetic acid/6.2% | 13.6% | 40.2% |
| CVL.10 | 40% | Acetic acid/4.6% | 13.6% | 41.8% |
| CVL.11 | 40% | Acetic acid/3.0% | 13.6% | 43.4% |
| CVL.12 | 40% | Acetic acid/2.3% | 13.6% | 44.1% |
| CVL.R1 | 40% | none | 13.6% | 46.4% |
| CVL.R2 | 40% | ACE/5.0% | 13.6% | 41.4% |
| CVL.R3 | 40% | ACE/1.7% | 13.6% | 44.8% |
| CVL.R4 | 40% | MFA/5.0% | 13.6% | 41.4% |
| CVL.R5 | 40% | MFA/1.7% | 13.6% | 44.8% |

Then, in each case, 1 part by weight of said silicon solution SVL.1 was combined with 1.46 parts by weight of calcium solutions CVL.1-CVL.12 and CVL.R1-CVL.R5 by means of a gear pump (MCP-Z, Ismatec) at 1 to 5 ml/s in a rotor-stator mixer (Megatron MT3000 with rotor-stator MTG 30/4, Kinematica AG) at 10,000 rpm. Here, the molar ratio of calcium to silicon was 1.0.

Table 3 provides an overview of the setting and hardening accelerators thus produced:

TABLE 3

Overview of the setting and hardening accelerators produced according to production process 1. All percentages are % by weight. Viscosities were determined at a temperature of 23° C.

| No. | Basis | Acidic compound (proportion) | pH | Viscosity |
|---|---|---|---|---|
| B.1 | SVL.1/CVL.1 | Oxalic acid (4.2%) | 10.0 | 200 mPas |
| B.2 | SVL.1/CVL.2 | Nitric acid (9.0%) | 9.1 | 400 mPas |
| B.3 | SVL.1/CVL.3 | Nitric acid (6.3%) | 9.9 | 600 mPas |
| B.4 | SVL.1/CVL.4 | Sulfaminic acid (9.0%) | 9.2 | 360 mPas |
| B.5 | SVL.1/CVL.5 | Formic acid (2.6%) | 10.1 | 600 mPas |
| B.6 | SVL.1/CVL.6 | Formic acid (2.1%) | 10.5 | 840 mPas |
| B.7 | SVL.1/CVL.7 | Acetic acid (7.4%) | 9.3 | 80 mPas |
| B.8 | SVL.1/CVL.8 | Acetic acid (5.5%) | 9.5 | 120 mPas |
| B.9 | SVL.1/CVL.9 | Acetic acid (3.7%) | 10.0 | 360 mPas |
| B.10 | SVL.1/CVL.10 | Acetic acid (2.8%) | 10.4 | 960 mPas |
| B.11 | SVL.1/CVL.11 | Acetic acid (1.8%) | 10.8 | 1,320 mPas |
| B.12 | SVL.1/CVL.12 | Acetic acid (1.4%) | 10.7 | >4,000 mPas |
| B.R1 | SVL.1/CVL.R1 | none (0%) | 11.1 | >4,000 mPas |
| B.R2 | SVL.1/CVL.R2 | ACE (3.0%) | 11.1 | >4,000 mPas |
| B.R3 | SVL.1/CVL.R3 | ACE (1.0%) | 11.1 | >4'000 mPas |
| B.R4 | SVL.1/CVL.R4 | MFA (3.0%) | 11.1 | >4,000 mPas |
| B.R5 | SVL.1/CVL.R5 | MFA(1.0%) | 11.1 | >4,000 mPas |

Column "basis" in Table 3 indicates silicon solutions SVL and calcium solutions CVL used. The proportion of said acidic compound is based on the total weight of the respective setting and hardening accelerator after production.

Viscosities were measured using a rotational viscometer from Brookfield, model RVT. The measurements were carried out at 100 rpm and a temperature of 23° C.

The solids content of the setting and hardening accelerators produced was consistently at 20% by weight.

2.2 Production Process 2

Production process 2 is based on the addition of said acidic compound following the reaction of said calcium compound CV with said silicon compound SV.

In a first step, a silicon solution SVL.1 was prepared as described in production process 1.

In parallel, separately different calcium solutions CVL.1', CVL.7', CVL.8', CVL.9' and CVL.R2', CVL.R3', CVL.R4' and CVL.R5' were produced. Here, said calcium solution CVL.1', produced according to production process 2, was produced with the same components and quantities as in said calcium solution CVL.1 according to production process 1, however, no acid compound or no oxalic acid was added. Accordingly, calcium solutions CVL.7', CVL.8', CVL.9', and CVL.R2', CVL.R3', CVL.R4' and CVL.R5', as corresponding calcium solutions CVL.7, CVL.8, CVL.9, and CVL.R2, CVL.R3, CVL.R4 and CVL.R5 were produced without the addition of said respective acidic compound.

Then, in each case, 1 part by weight of said silicon solution SVL.1 was combined with 1.46 parts by weight of calcium solutions CVL.1', CVL.7', CVL.8', CVL.9' and CVL.R2', CVL.R3', CVL.R4' and CVL.R5' by means of a gear pump (MCP-Z, Ismatec) at 1 to 5 ml/s in a rotor-stator mixer (Megatron MT3000 with rotor-stator MTG 30/4, Kinematica AG) at 10,000 rpm. Here, the molar ratio of calcium to silicon was 1.0.

Then, corresponding acidic compounds were added to the resulting reaction suspensions thus obtained, namely:

4.2% by weight oxalic acid to reaction suspension SVL.1/CVL.1'
7.4% by weight acetic acid to reaction suspension SVL.1/CVL.7'
5.5% by weight acetic acid to reaction suspension SVL.1/CVL.8'
3.7% by weight acetic acid to reaction suspension SVL.1/CVL.9'
3.0% by weight ACE to reaction suspension SVL.1/CVL.R2'
1.0% by weight ACE to reaction suspension SVL.1/CVL.R3'
3.0% by weight MFA to reaction suspension SVL.1/CVL.R4'
3.0% by weight MFA to reaction suspension SVL.1/CVL.R5'

Table 4 provides an overview of the setting and hardening accelerators thus produced:

TABLE 4

Overview of the setting and hardening accelerators produced according to production process 2. All percentages are % by weight. Viscosities were determined at a temperature of 23° C.

| No. | Basis | Acidic compound (proportion) | pH | Viscosity |
|---|---|---|---|---|
| B.1' | SVL.1/CVL.1' | Oxalic acid (4.2%) | 9.4 | 840 mPas |
| B.7' | SVL.1/CVL.7' | Acetic acid (7.4%) | 8.9 | 800 mPas |
| B.8' | SVL.1/CVL.8' | Acetic acid (5.5%) | 9.1 | 840 mPas |
| B.9' | SVL.1/CVL.9' | Acetic acid (3.7%) | 9.4 | 1160 mPas |
| B.R2' | SVL.1/CVL.R2' | ACE (3.0%) | 11.0 | >1,400 mPas |
| B.R3' | SVL.1/CVL.R3' | ACE (1.0%) | 11.0 | >2,800 mPas |
| B.R4' | SVL.1/CVL.R4' | MFA (3.0%) | 11.0 | >4,000 mPas |
| B.R5' | SVL.1/CVL.R5' | MFA (1.0%) | 11.0 | >4,000 mPas |

The solids content of the setting and hardening accelerators produced was consistently at 20% by weight.

From the data in Tables 3 and 4 it is particularly evident that the use of acidic compounds according to the invention with a relatively low molecular weight (accelerators B.1-B.12 and B.1'-B.9') compared to polymeric compounds such as ACE and MFA (accelerators B.R2-B.R5) leads to significantly lower viscosities. This is particularly the case with acetic acid.

A comparison of the data in Tables 3 and 4 also shows that, with production process 1 significantly lower viscosities are attainable than with production process 2. It is worth noting, for example, a comparison of accelerators B.7 and B.7'. Said accelerator B.7, produced according to production process 1 has a viscosity of only 80 mPas. Corresponding accelerator B.7', produced by production process 2, however, has a ten times higher viscosity of 800 mPas.

2.3 Stability Tests

The setting and hardening accelerators produced were stored for 4-6 months at room temperature and tested regularly with respect to their consistency.

As has been found, setting and hardening accelerators according to the invention B.1-B.12 and B.1'-B.9' are stable for several months, and change consistency or viscosity only slightly. Thus, these accelerators can be stored for long periods and can be easily used in mortar or concrete compositions at any time.

Non-inventive setting and hardening accelerators B.R2-B.R5 thickening was observed after only a few days. Some of the accelerators became even solid, which greatly complicates the later the use in mortar or concrete compositions.

3. Mortar Experiments 3.1 Providing said Setting and Hardening Accelerators

Setting and hardening accelerators for both comparative experiments and experiments according to the invention were each mixed with the mixing water for the mortar mixtures, which was then used to mix the mortar mixtures. Setting and curing accelerators were each used in a concentration of 4.0% by weight, based on the binder.

3.2 Other Additives

In all of the mortar experiments described below, a modified polycarboxylate PCE in form of Sika® ViscoCrete®-3081 S was used as plasticizer. Sika® ViscoCrete®-3081 S is a comb polymer with polycarboxylate backbone and polyalkylene oxide side chains attached via ester groups. Said plasticizer was used at a concentration of 1.0% by weight, based on the binder, and also admixed in advance with the mixing water.

3.3 Mortar Mixtures

The effectiveness of said hardening accelerators according to the invention was tested in mortar mixes. For this purpose, a mortar was used as specified in Table 5.

TABLE 5

Composition of the dry mortar mixtures used (maximum grain size of 8 mm).

| Component | Quantity [g] |
|---|---|
| Portlandzement | |
| Schweizer CEM I 42.5N | 750 |
| Blaine fineness: 3,600 cm²/g | |
| Limestone filler | 141 |
| Round sand 0-1 mm | 738 |
| Round sand 1-4 mm | 1107 |
| Round sand 4-8 mm | 1154 |

The cement used was Schweizer CEM I 42.5 N Normo 4 [Holcim AG/Siggenthal]) with a Blaine fineness of 3,600 cm$^2$/g. The sands, limestone filler and cement were mixed dry for 1 minute in a Hobart mixer. The mixing water in which plasticizer PCE (1.0% by weight based on cement) and, where appropriate, said hardening accelerator, was/were dissolved or dispersed was added within 10 seconds, and mixed for another 2.5 minutes. The total mixing time wet lasted 3 minutes in each case. The water/cement ratio (w/c ratio) was consistently 0.4.

3.4 Test Procedure

To determine the effectiveness of said hardening accelerators according to the invention, early compressive strength of the mortar mixtures was determined 8 hours and 24 hours after mixing the mortar mixtures. In each case, the flow diameter (ABM) was measured immediately after mixing said mortar mixtures.

The test for determining compressive strength (in $N/mm^2$) was carried out on prisms (40×40×160 mm) according to standard EN 12390-1 to 12390-4. Flow diameter (ABM) of the mortar was determined according to EN 1015-3.

Also, the temperature curve of said mortar mixtures was recorded as control of hydration and setting behavior, respectively, of said mortar mixtures after mixing, and the time to onset of the global temperature maximum was determined.

3.5 Results

Table 6 provides an overview of the effect of said various setting and hardening accelerators B.1-B.12, R.1-B.R5, B.1'-B.9' and R.2'-B.R5' in mortar mixtures (M.1-M.12, M.R1-M.R5, M.1'-M.9', M.R2'-M.R5') with hardening accelerators. R is a reference sample which does not contain any setting/hardening accelerator, but otherwise has a composition identical to the other mixtures.

TABLE 6

Effect of said setting and hardening accelerators.
Columns "8 h" and "24 h" indicate compressive strengths after 8 and 24 hours, respectively. Columns "Δ (8 h)" and "Δ (24 h)" indicate the percentage change of the respective compressive strength, based on said reference sample R. In column "T", the time, in hours, to occurrence of the global temperature maximum is provided.

| No. | Accelerator | T [h] | ABM [mm] | 8 h | Δ (8 h) | 24 h | Δ (24 h) |
|---|---|---|---|---|---|---|---|
| R | None | 15.8 | 210 | 0.8 | 0% | 25.7 | 0% |
| M.1 | B.1 (Oxalic acid; 4.2%) | 11.2 | 182 | 2.3 | 188% | 40.5 | 58% |
| M.2 | B.2 (Nitric acid; 9.0%) | 10.8 | 190 | 2.7 | 238% | 41.6 | 62% |
| M.3 | B.3 (Nitric acid; 6.3%) | 10.8 | 183 | 2.9 | 263% | 41.1 | 60% |
| M.4 | B.4 (Sulfaminic acid; 9.0%) | 11.3 | 187 | 2.5 | 213% | 40.5 | 58% |
| M.5 | B.5 (Formic acid; 2.6%) | 11.2 | 175 | 2.5 | 213% | 41.6 | 62% |
| M.6 | B.6 (Formic acid; 2.1%) | 10.8 | 173 | 2.9 | 263% | 39.8 | 55% |
| M.7 | B.7 (Acetic acid; 7.4%) | 12.7 | 178 | 2.1 | 163% | 37.4 | 46% |
| M.8 | B.8 (Acetic acid; 5.5%) | 12.0 | 191 | 2.3 | 188% | 39.3 | 48% |
| M.9 | B.9 (Acetic acid; 3.7%) | 11.7 | 173 | 2.4 | 200% | 40.1 | 56% |
| M.10 | B.10 (Acetic acid; 2.8%) | 10.5 | 163 | 3.1 | 288% | 39.3 | 53% |
| M.11 | B.11 (Acetic acid; 1.8%) | 10.8 | 170 | 3.3 | 313% | 40.7 | 58% |
| M.12 | B.12 (Acetic acid; 1.4%) | 10.0 | 172 | 3.6 | 350% | 42.6 | 66% |
| M.R1 | B.R1 (no acid) | 9.3 | 130 | 5.6 | 600% | 39.2 | 53% |
| M.R2 | B.R2 (ACE; 3.0%) | 8.8 | 128 | 6.9 | 763% | 37.7 | 47% |
| M.R3 | B.R3 (ACE; 1.0%) | 8.8 | 138 | 7.5 | 838% | 37.5 | 46% |
| M.R4 | B.R4 (MFA; 3.0%) | 9.0 | 125 | 8.0 | 900% | 37.8 | 47% |
| M.R5 | B.R5 (MFA; 1.0%) | 8.7 | 130 | 7.3 | 813% | 37.4 | 46% |
| M.1' | B.1' (Oxalic acid; 4.2%) | 9.5 | 132 | 4.7 | 488% | 39.6 | 54% |
| M.7' | B.7' (Acetic acid; 7.4%) | 10.2 | 150 | 3.5 | 338% | 37.5 | 46% |
| M.8' | B.8' (Acetic acid; 5.5%) | 9.8 | 147 | 3.9 | 388% | 37.6 | 46% |
| M.9' | B.9' (Acetic acid; 3.7%) | 9.2 | 148 | 4.4 | 450% | 38.9 | 51% |
| M.R2' | B.R2' (ACE; 3.0%) | 8.8 | 138 | 6.7 | 738% | 38.7 | 51% |
| M.R3' | B.R3' (ACE; 1.0%) | 8.5 | 134 | 5.3 | 563% | 37.8 | 47% |
| M.R4' | B.R4' (MFA; 3.0%) | 8.7 | 132 | 6.1 | 663% | 37.6 | 46% |
| M.R5' | B.R5' (MFA; 1.0%) | 8.3 | 128 | 6.3 | 688% | 40.4 | 57% |

From the data in Table 6 it is evident that, in particular, with accelerators B.1-B.9 and B.1'-B.9' higher compressive strengths are achieved after 24 hours compared with accelerators B.R2-B.R5 and B.R2'-B.R5' (not inventive).

It is also apparent that compressive strengths after 8 hours are generally better with accelerators which were produced according to production process 2 (B.1'-B.9') than with accelerators produced by production process 1 (B.1-B.9). In case of compressive strength after 24 hours, however, the situation is reversed.

With respect to workability of the mortar mixtures and their flow diameter, respectively, accelerators B.1-B.9 and B.1'-B.9' are almost consistently better compared to accelerators B.R2-B.R5 and B.R2'-B.R5' (not inventive). Accelerators B.1-B.9 produced by production process 1 achieve generally better results compared with corresponding accelerators B.1'-B.9' produced by production process 2.

Taking into account the viscosities of said accelerators (cf., Tables 3 and 4), besides the compressive strengths and workability that can be achieved, acetic acid, in particular, constitutes an optimal choice. This is true, in particular, at concentrations of 2-8%, especially at concentrations around 4%.

The embodiments described above are, however, to be understood as illustrative examples only, which can be modified as desired within the scope of the invention.

The invention claimed is:

1. A process for the preparation of a one-component setting and hardening accelerator for mineral binders, comprising the steps of:

a) reacting a calcium compound CV with a silicon compound SV, wherein
  the calcium compound CV is selected from the group consisting of calcium chloride, calcium nitrate, calcium formate, calcium acetate, calcium bicarbonate, calcium bromide, calcium citrate, calcium chlorate, calcium hydroxide, calcium oxide, calcium hypochloride, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium maleinate, calcium fumarate, calcium adipate, and calcium aluminate, and the silicon compound SV is selected from the group consisting of sodium silicate, potassium silicate, lithium silicate, water glass, silicic acid, sodium metasilicate, potassium metasilicate, disodium metasilicate, dipotassium metasilicate, silica, disodium disilicate, and disodium trisilicate; and b) addition of an acidic compound having a molecular weight of not more than 200 g/mol, wherein the acidic compound comprises nitric acid, sulfamic acid, methanesulfonic acid, formic acid, acetic acid, fumaric acid, oxalic acid, maleic acid, maleic acid anhydride, glycolic acid and/or lactic acid; wherein the acidic compound is added before and/or during, step a) and following the production of the setting and hardening accelerator, a pH value is in the range of from 7-12.

2. The process according to claim 1, wherein before the reaction in step a) said calcium compound CV is provided in form of a solution CVL containing said calcium compound and, separately therefrom, said silicon compound SV is provided in form of a solution SVL containing said silicon compound SV.

3. The process according to claim 2, wherein said acidic compound is provided as a component of said solution CVL together with said calcium compound CV.

4. The process according to claim 1, wherein said calcium compound CV is calcium nitrate and said silicon compound SV is sodium silicate, wherein during the reaction in step a) the molar ratio of calcium nitrate:sodium silicate=0.25-8.0.

5. The process according to claim 1, wherein a proportion of said acidic compound is 0.01-12% by weight, based on the total weight of the setting and hardening accelerator.

6. The process according to claim 1, wherein following the preparation of the setting and hardening accelerator a viscosity is in the range from 10-2000 mPas.

7. The process according to claim 1, wherein at least one further hardening-accelerating substance is added, said at least one further hardening-accelerating substance comprising one or more amino alcohols, one or more α-hydroxycarboxylic acids, one or more alkali metal and/alkaline earth metal thiocyanates, or one or more alkali and/or alkaline earth metal halides, glycerol and/or glycerol derivatives.

8. The process according to claim 1, wherein said process further comprises a step c) of comminuting of the reaction product from step a).

9. The process according to claim 1, wherein the acidic compound comprises nitric acid, sulfamic acid, formic acid and/or acetic acid.

10. The process according to claim 1, wherein the acidic compound comprises nitric acid, sulfamic acid and/or acetic acid.

11. The process according to claim 1, wherein the acidic compound comprises acetic acid.

12. The process according to claim 1, wherein the acidic compound has a molecular weight in the range of from 40 to 100 g/mol.

13. The process according to claim 1, wherein the calcium compound CV is selected from the group consisting of calcium chloride, calcium nitrate, calcium formate, calcium acetate, calcium bicarbonate, calcium bromide, calcium citrate, calcium chlorate, calcium oxide, calcium hypochloride, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium maleinate, calcium fumarate, calcium adipate, and calcium aluminate.

14. The process according to claim 1, wherein the calcium compound CV is selected from the group consisting of calcium nitrate, calcium acetate, and calcium sulfamate.

15. The process according to claim 1, wherein the silicon compound SV is selected from the group consisting of sodium silicate, potassium silicate, lithium silicate, water glass, sodium metasilicate, potassium metasilicate, disodium metasilicate, dipotassium metasilicate, silica, disodium disilicate, and disodium trisilicate.

16. The process according to claim 1, wherein the silicon compound SV is selected from the group consisting of sodium silicate and potassium silicate.

17. A setting and hardening accelerator produced by a process according to claim 1.

18. A binder-containing mixture comprising at least one mineral binder and at least one setting and hardening accelerator according to claim 17.

19. A method of improving early compressive strength of mineral binders, comprising adding a setting and hardening accelerator according to claim 17 to a mineral binder.

* * * * *